May 27, 1969     T. L. McKAY     3,446,101
INSERT DRIVER
Filed June 5, 1967     Sheet 1 of 2
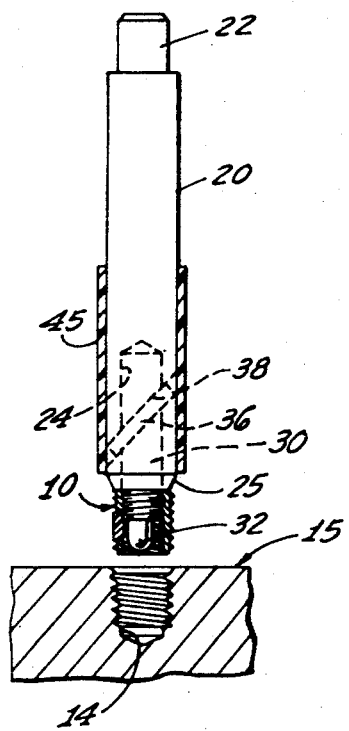
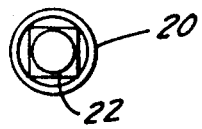
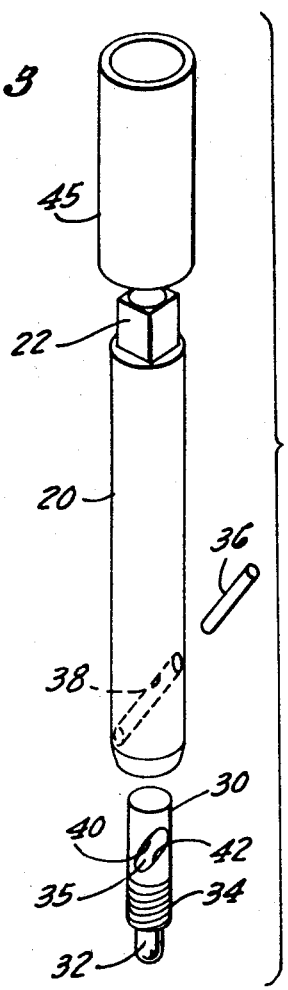
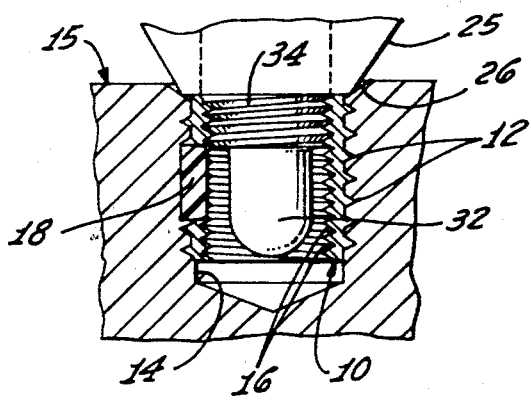
INVENTOR:
Thomas L. McKay
ATTORNEYS

United States Patent Office 3,446,101
Patented May 27, 1969

3,446,101
INSERT DRIVER
Thomas L. McKay, Los Angeles, Calif., assignor, by mesne assignments, to Whittaker Corporation, Los Angeles, Calif., a corporation of California
Filed June 5, 1967, Ser. No. 643,687
Int. Cl. B25b 13/00, 21/02; B23p 19/04
U.S. Cl. 81—53                     5 Claims

ABSTRACT OF THE DISCLOSURE

The body of a driver for installing an internally and externally threaded tubular insert in a bore has a tubular nose in which an axial stud is mounted, the leading end of the stud extending beyond the nose of the driver body to screw into the tubular insert thereby to permit the driver to serve as a handle for installation of the insert. For quickly and easily loosening the driver from the installed tubular insert to permit the driver to be withdrawn from the insert, the driver body is in cam engagement with the stud to permit loosening of the installed insert from the nose of the driver body by reverse rotation of the driver body relative to the stud.

Background of the invention

Internally and externally threaded tubular metal inserts are commonly installed in the threaded bores of soft metal members to receive screw-threaded fastening members and the problem is to provide a suitable tool or driver to facilitate such an installation. The simplest driver is a stud formed with flats for engagement by a suitable wrench, the driver having a radial stop shoulder to abut one end of the tubular insert and having an externally threaded end to screw into the insert. With a tubular insert screwed tight against the stop shoulder of the driver, the driver is rotated to screw the insert into the threaded bore and then rotation of the driver is reversed to loosen the insert from the driver and to withdraw the driver from the insert.

In some instances such a one-piece driver is satisfactory for its purpose but in many other instances reversing the rotation of the driver after a tubular insert is installed fails to release the driver from the insert with the result that the reverse rotation of the driver simply unscrews the insert from the bore in which it has been installed.

One prior art attempt to solve this problem is to impose a ball bearing between the insert and the stop shoulder of the driver. The ball bearing is intended to reduce the resistance to reverse rotation of the driver relative to the insert but the low pitch of the screw threads limits the success of this solution.

Another prior art attempt to meet this problem is to provide a driver with a nut screwed thereon to serve as the stop shoulder for locking abutment with the end of the insert. With the leading end of the driver screwed into a tubular insert, the nut is tightened against the insert to anchor the insert to the driver. After the tubular insert is installed, the nut on the driver is loosened to free the driver from the insert and to permit withdrawal of the driver from the insert. The disadvantage of such a procedure is that two wrenches are required to engage the driver and the nut respectively to loosen the nut from the tubular insert.

The present invention meets this problem without using a ball bearing or using a locking nut and without requiring two wrenches to carry out the installation procedure.

Summary of the invention

Instead of forming an insert-engaging stud with flats for rotation by a wrench, the invention teaches mounting the stud in a tubular leading end of a driver body and providing the driver body with flats for engagement by a wrench. With the stud protruding from the driver body, the leading tubular end or nose of the driver body serves as a stop shoulder against which the insert is tightened by the threaded end of the stud. To release the driver from an installed tubular insert, provision is made to loosen the nose of the driver body from the insert by slight axial retraction of the driver body relative to the stud in response to slight reverse rotation of the driver body.

To carry out the purpose of the invention, the stud in the leading end of the driver body has freedom for slight rotation relative to the driver body to permit an inner shoulder of the driver body to move into and out of engagement with a cooperative shoulder of the stud. At least one of the two cooperating shoulders is inclined relative to the axis of the driver body for cam action by the two shoulders in response to the relative rotation. The cam action causes slight retraction of the stud to quickly tighten the tubular insert on the stud against the tubular nose of the driver body for the purpose of installing the insert and subsequent reversing the relative rotation which releases the insert just as quickly. In effect the cam action is a screw action of limited range of rotation at a pitch angle that greatly exceeds the pitch angle of the inner screw thread of the insert and the cooperating outer screw thread of the stud. The significance of the high pitch angle involved in the cam action between the driver body and the stud may be understood when it is considered that in using a one-piece driver the tubular insert is drawn against the stop shoulder of the driver by the engagement of the outer screw thread of the driver with the inner screw of the tubular insert and the low pitch of the two screw threads causes the insert to lock so effectively against the stop shoulder that reverse torque of substantial magnitude is required to loosen the driver from an installed tubular insert. If the reverse torque that is required to loosen the driver from the insert is of greater magnitude than the reverse torque required to unscrew the tubular insert from the threaded bore in which it is installed, the reverse rotation of the driver defeats the purpose of the driver by simply withdrawing the installed insert.

The invention takes advantage of the fact that when two members are tightened against each other by cooperating screw threads, the locking effect or resistance to loosening by reverse rotation varies inversely with the pitch angle of the cooperating screw threads. A locking action by a high pitch screw is easily broken by reverse rotation because a relatively small amount of rotation results in substantial axial movement.

In the present invention a low pitch angle necessarily exists in the screw engagement of the stud with the tubular insert but a compensating high pitch angle exists in the screw or cam engagement of the driver body with the stud. In effect, the invention provides a locking action of the tubular insert against the nose of the driver body by employing a low pitch screw means in series with a high pitch screw means and since the two screw means are in series or in tandem, loosening of the high pitch screw means results in loosening of the low pitch screw means without the necessity of reverse rotation of the low pitch screw means.

The various features and advantages of the invention may be understood from the following detailed description and the accompanying drawings.

Brief description of the drawings

In the drawings, which are to be regarded as merely illustrative:

FIG. 1 is an elevational view partly in section illustrating a preferred embodiment of the invention poised for screwing a tubular insert into a threaded bore;

FIG. 2 is a plan view of the upper end of the driver;

FIG. 3 is an exploded perspective view showing the various parts of the driver;

FIG. 4 is a greatly enlarged fragmentary view, partly in side elevation and partly in section, showing how the tubular nose of the driver body serves as stop means to limit the degree to which a tubular insert is screwed into the threaded bore;

Description of the preferred embodiment

Figure 5:
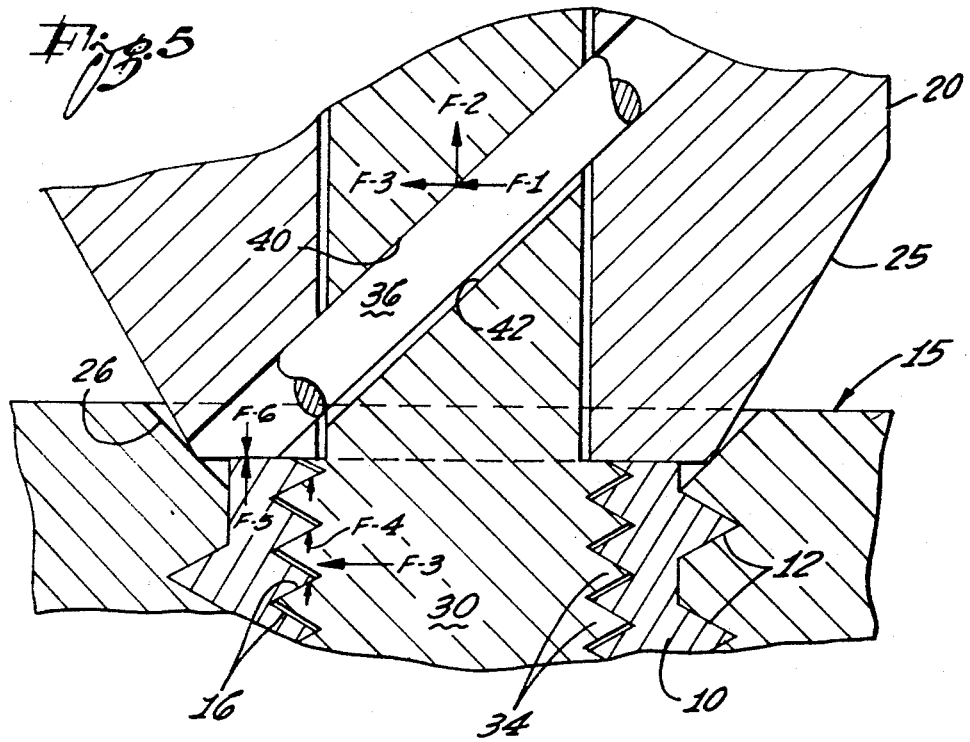
FIG. 5 is a greatly enlarged diagrammatic sectional view showing the forces including a cam force that are involved in tightening a tubular insert against the nose of the driver body.
Figure 6:
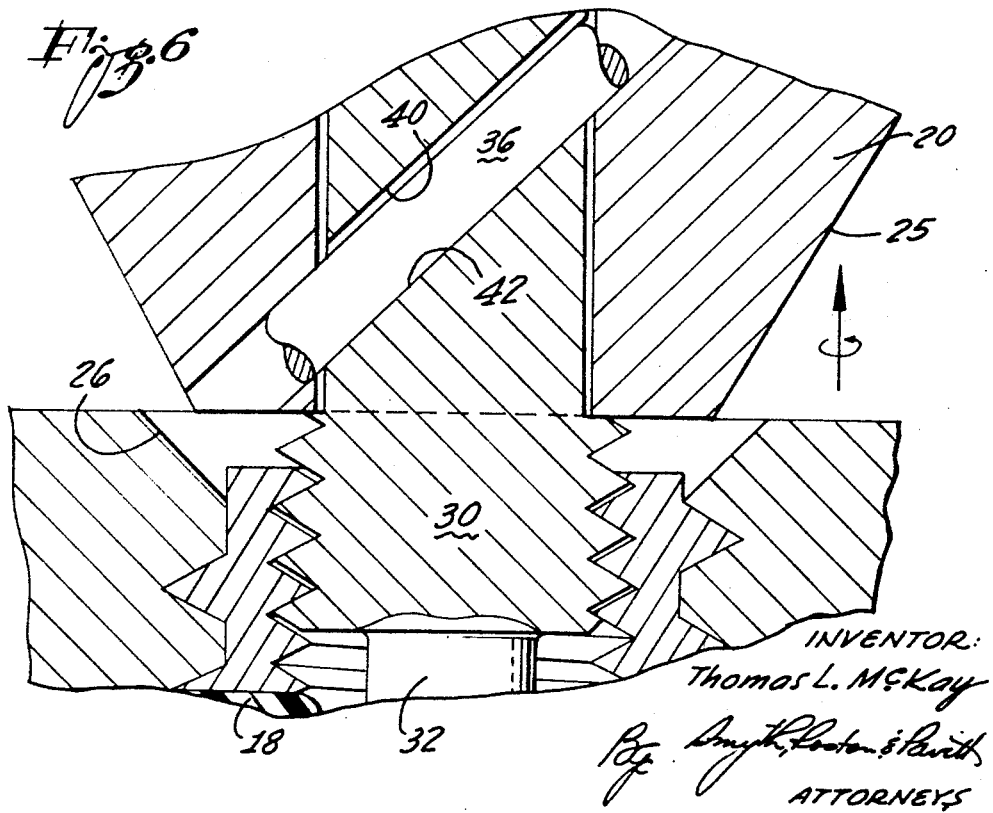
FIG. 6 is a view similar to FIG. 5 showing how initiating reverse rotation of the driver body quickly terminates the cam action to loosen the tubular insert from the nose of the driver to permit continued reverse rotation of the driver to unscrew the stud from the installed insert.

FIG. 4 shows a tubular insert, generally designated 10, with an external screw thread 12 by means of which the insert is screwed into a threaded bore 14 of an aluminum member 15. The insert 10 has a low pitch internal screw thread 16 and has a longitudinal slot in which is mounted a small body 18 of resiliently deformable plastic material for locking action both between the insert and whatever threaded fastening member is subsequently screwed into the tubular insert.

The presently preferred embodiment of the driver includes an elongated driver body 20 of circular cross section having a reduced rear end 22 of square cross section to provide flats for engagement by a wrench. The leading end of the driver body 20 is tubular, being provided with a blind axial bore 24 and is tapered to form a tapered nose 25 that is dimensioned to abut the rear end of a tubular insert 10. Preferably the tapered nose 25 is wider than the insert 10 to serve as a stop for abutment against the chamfer 26 at the entrance of the threaded bore 14 to limit the extent to which the insert 10 is screwed into the threaded bore.

A stud 30 is rotatably and slidably mounted in the axial bore 24 with the stud extending axially from the tapered nose 25 of the driver body 20. The leading end of the stud 30 is reduced in diameter and rounded to form a pilot 32 to facilitate entrance of the stud into a tubular insert. Adjacent the pilot 32 the stud 30 is formed with an outer screw thread 34 of relatively low pitch to engage the internal screw thread 16 of a tubular insert. As may be seen in FIG. 4 the screw thread 34 of the stud 30 is relatively short, i.e. has relatively few turns to avoid cutting into the plastic body 18 and it is to be noted that the pilot 32 of the stud is of sufficiently reduced diameter to avoid impingement of the plastic body.

A cam or high pitch screw engagement of the driver body 20 with the stud 30 may be provided in various ways in various embodiments of the invention. In this instance, as best shown in FIG. 3, the stud 30 is formed with a peripheral diagonal slot 35 and a cooperating diagonal pin 36 is mounted in a diagonal bore 38 in the driver body 20 with the pin extending longitudinally through the diagonal slot.

One side of the diagonal pin 36 serves as a diagonal shoulder for abutment against the diagonal shoulder 40 that is formed by one side wall of the slot 35, these two shoulders cooperating for rotation of the stud 30 by the driver body 20 in a direction to screw an insert 10 into a threaded bore 14. In like manner the other side of the diagonal pin 36 serves as a diagonal shoulder to abut a second diagonal shoulder 42 formed by the other side wall of the slot 35 for the purpose of rotating the stud in reverse direction for withdrawing the driver from an installed insert. With the stud 30 slidable as well as rotatable in the axial bore 24, it is apparent that the diagonal pin 36 and the diagonal slot 35 permit both limited rotation and limited axial movement of the stud relative to the driver body.

In the preferred practice of the invention, a suitable plastic sleeve 45 is shrunk onto the driver body 20 to serve as grip means to facilitate manual rotation of the driver. The plastic sleeve 45 also serves as means to retain the diagonal pin 36 in the diagonal bore 38.

Referring to diagrammatic FIG. 5 the external screw thread 34 of the stud 30 and the internal screw thread 16 of the tubular insert 10 constitute a first screw means having a relatively low pitch. The diagonal pin 36 in combination with the two side walls 40 and 42 of the diagonal slot constitutes a second screw means having a relatively high pitch angle of approximately 45°. The manner in which the two screw means act in series or in tandem to tighten the insert 10 against the tapered nose 25 of the driver body 20 may be understood by considering the forces indicated by the arrows in FIG. 5.

When the driver body 20 rotates the stud 30 clockwise to screw the tubular insert 10 into the threaded bore of the aluminum body 15, the rotational force F-1 of the driver body is applied to the inclined side wall 40 of the slot and is resolved into two components, namely, an axially upward component F-2 on the stud 30 and a component F-3 that tends to rotate the stud clockwise. The clockwise rotation of the stud 30 by the driver body creates screw action between the thread 34 of the stud and the inner thread 16 of the tubular insert 10 whereby the stud applies upward axial force to the tubular insert as indicated by the arrow F-4, to cause the tubular insert to exert an upward force F-5 against the nose 25 of the driver body 20. The upward force F-5 by the tubular insert is opposed by the downward force F-6 of the driver body, F-6 being the reaction to the first mentioned force F-1. It is the pressure between the upper end of the tubular insert 10 and the nose 25 of the driver body created by the opposing forces F-5 and F-6 that binds or locks the insert against the nose 25 of the driver body.

It is apparent that the upward force F-4 created by the screw action between the stud 30 and the tubular insert 10 and the upward force F-2 created by the screw or cam action between the driver body 20 and the stud 30 are in series or in tandem to create the opposing forces F-5 and F-6 that lock the tubular insert against the driver body. It is also apparent that because of the low pitch of the cooperating screw threads of the stud and the tubular insert it would be difficult to terminate the opposed forces F-5 and F-6 by reverse rotation of the stud relative to the tubular insert but that the high pitch angle of the screw or cam action between the driver body and the stud would make it relatively easy to terminate the opposing forces F-5 and F-6 by reverse rotation of the driver body relative to the stud.

The manner in which the described driver is manipulated for the purpose of installing a tubular insert in a threaded bore may be readily understood from the foregoing description. In preparation for installing an insert, the insert is simply screwed by hand onto the stud 30 until the tubular insert tightens against the nose of the driver body. It is to be noted that the clockwise rotation of the tubular insert tends to rotate the stud clockwise relative to the driver body with consequent pressure of the inclined side wall 40 of the groove against the inclined pin 36 to tighten the insert against the nose of the driver body.

With the tubular insert frictionally locked against the driver body by the binding action of the opposing forces F-5 and F-6, the driver body is manipulated in a rotary manner to screw the insert into the threaded bore 14 of the aluminum member 15. The resistance to rotation of the tubular member in the threaded bore tends to tighten the tubular insert against the driver body, i.e. tends to increase the opposed forces F-5 and F-6.

When the nose of the driver body makes contact with the chamfer surface 26 at the entrance to the threaded bore to stop the advance of the tubular insert into the threaded bore, the operator merely reverses the rotation of the driver body 20 to destroy the binding forces F-5 and F-6 by retreat of the inclined pin 36 from the inclined side wall 40 of the inclined slot. Continued reverse or counterclockwise rotation of the driver body causes the inclined pin 36 to bear against the second inclined side wall 42 of the slot to rotate the stud 30 counterclockwise and thus unscrew the stud from the installed tubular insert.

My description in specific detail of the presently preferred embodiment of the invention will suggest various changes, substitutions and other departures from my disclosure within the spirit and scope of the appended claims.

I claim:
1. In a driver for installing an internally and externally threaded tubular insert in a bore, the combination of:
   a driver body having a tubular leading end shaped and dimensioned to abut the end of the tubular insert;
   a stud mounted in the tubular leading end of the driver body for relative rotary and axial movement therein,
   said stud having a leading end protruding from the leading end of the driver body,
   the leading end of the stud having an external screw thread to engage the internal screw thread of the tubular insert,
   said stud having a peripheral slot; and
   a pin fixedly mounted on the driver body and extending into the slot longitudinally thereof,
   said slot and pin being inclined relative to the axis of the stud for cam action between the pin and a side wall of the slot to retract the stud and thereby pull a tubular insert on the stud into immobilizing pressure against the leading end of the driver body to permit the driver body to serve as a handle for screwing the insert into the threaded bore,
   the driver body being releasable from the installed tubular insert by reverse rotation of the driver body relative to the stud.

2. A driver as set forth in claim 1 in which the driver body has a peripheral plastic sleeve to facilitate manually gripping the driver body.

3. A driver as set forth in claim 2 in which said pin is mounted in an inclined bore in the driver body and the plastic sleeve covers the opposite ends of the inclined bore to confine the pin in the bore.

4. In a driver for installing an internally and externally threaded tubular insert in a bore, the combination of:
   a driver body having a tubular leading end shaped and dimensioned to abut the end of the tubular insert;
   a stud mounted in the tubular leading end of the driver body for relative rotary and axial movement therein,
   said stud having a leading end protruding from the leading end of the driver body,
   the leading end of the stud having an external screw thread to engage the internal screw thread of the tubular insert,
   said stud having a peripheral slot; and
   means inside the tubular leading end of the driver body projecting inwardly therefrom into the peripheral slot,
   said slot being inclined relative to the axis of the stud for cam action between the inwardly projecting means and the side wall of the slot to retract the stud and thereby pull a tubular insert on the stud into immobilizing pressure against the leading end of the driver body to permit the driver body to serve as a handle for screwing the insert into the threaded bore,
   the driver body being releasable from the installed tubular insert by reverse rotation of the driver body relative to the stud.

5. In a driver for installing an internally and externally threaded tubular insert in a bore, the combination of:
   a driver body having a tubular leading end shaped and dimensioned to abut the end of the tubular insert;
   a stud mounted in the tubular leading end of the driver body for relative rotary and axial movement therein,
   said stud having a leading end protruding from the leading end of the driver body,
   the leading end of the stud having an external screw thread to engage the internal screw thread of the tubular insert,
   said stud having a peripheral recess forming a peripheral shoulder; and
   means projecting radially inwardly from the tubular leading end of the driver body into said recess for cooperation with said peripheral shoulder,
   said peripheral shoulder being inclined relative to the axis of the stud for cam action between the inwardly projecting means and the shoulder of the recess to retract the stud and thereby pull a tubular insert on the stud into immobilizing pressure against the leading end of the driver body to permit the driver body to serve as a handle for screwing the insert into the threaded bore,
   the driver body being releasable from the installed tubular insert by reverse rotation of the driver body relative to the stud.

References Cited
UNITED STATES PATENTS

| | | | |
|---|---|---|---|
| 1,125,186 | 1/1915 | Schneider | 81—53 |
| 1,384,417 | 7/1921 | Weichhart | 81—53 |
| 3,269,225 | 8/1966 | Neuschotz | 81—53 |
| 3,282,135 | 11/1966 | Hogan | 81—53 |
| 3,290,968 | 12/1966 | Parmock et al. | 81—53 |

ROBERT C. RIORDON, *Primary Examiner.*

R. V. PARKER, JR., *Assistant Examiner.*

U.S. Cl. X.R.

29—240